United States Patent [19]
Studanski

[11] Patent Number: 5,829,184
[45] Date of Patent: Nov. 3, 1998

[54] ZIGZAG AQUATIC DEVICE AND METHOD

[76] Inventor: Richard R. Studanski, 320 8th St. NE., Sartell, Minn. 56377

[21] Appl. No.: 562,501

[22] Filed: Nov. 24, 1995

[51] Int. Cl.[6] ................................................. A01K 97/12
[52] U.S. Cl. ............................................... 43/43.13
[58] Field of Search ................................................ 43/43.13

[56] References Cited

U.S. PATENT DOCUMENTS

| | | | |
|---|---|---|---|
| 3,153,298 | 10/1964 | Lemon | 43/43.13 |
| 4,380,131 | 4/1983 | Lazan, Jr. | 43/43.13 |
| 4,524,539 | 6/1985 | Morris | 43/43.13 |

*Primary Examiner*—Kurt Rowan

[57] ABSTRACT

A method and apparatus wherein an aquatic device tethered by a single line provides an accentuated zigzag or oscillating movement when the device has a relative speed with respect to water, the device may be either buoyant or submergible. The device has a frame, a pair of pintles, a tow or retrieval structure for connection to a line, and a bi-stable guidance vane which snaps from portside to starboard to portside and so on to cause the device to produce a zigzag pattern from right to left to right and so on, without electrical control or power.

17 Claims, 6 Drawing Sheets

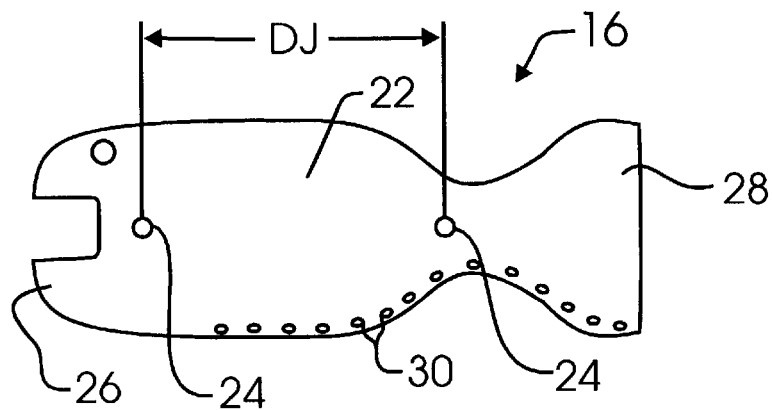
FIG. 3
FIG. 4
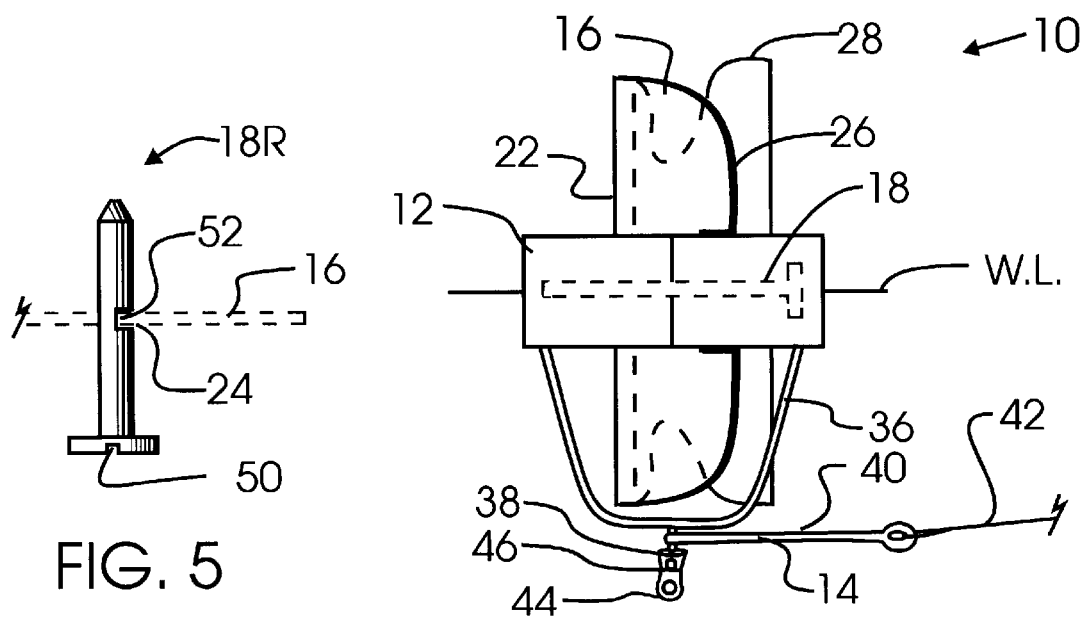
FIG. 5
FIG. 6

ZIGZAG AQUATIC DEVICE AND METHOD

FIELD OF THE INVENTION

This invention pertains to a method and apparatus for providing zigzag movement to an aquatic device, such as an otter or fishing lure.

THE PRIOR ART

Aquatic outriggers, otters and diving devices are well known. Fishing baits that have movement are well known. No particular example of any prior art is known to have either a structure or method for significant zigzag movement.

OBJECTS OF THE INVENTION

It is an object of this invention to provide a new method and apparatus for towed aquatic devices, providing zigzag or oscillating motion.

It is an object of this invention to provide a new towed aquatic apparatus that provides a significant large zigzag motion.

It is an object of this invention to provide a new guidance vane for a towed aquatic device.

It is an object of this invention to provide a new and/or improved self-steering towed aquatic device.

SUMMARY OF THE INVENTION

An aquatic device for providing zigzag motion has a frame, a line connector, a pair of pintles on the frame, and a bi-stable guidance vane which is relatively flexible and which snaps back and forth between the pintles to make the device go left, then right, then left and so on, or up and down as the case may be, as the device is given a relative velocity in water.

A guidance vane for an aquatic device is devised of an elongate flat resilient planar sheet, and has a journal on each end and tension structure in between the journals which compresses a main section of the vane into a bowed geometry relatively is bi-stable to either side of the tension structure.

A method of providing self-steering zigzag motion in an aquatic device has the steps of providing a frame, mounting a flat plastic guidance vane in compression upon the frame and holding the vane in bi-stable curved position, moving the device through water with a tether line, causing the vane to repetitively snap back and forth thereby causing the device to effect a significant zigzag motion in the water. These and other objects and aspects of the invention will become manifest to those versed in the art, upon review of the teachings herein and with experience herein.

BRIEF DESCRIPTION OF THE DRAWINGS

FIG. 3 is an elevational side view of new and improved guidance vane for the structure of FIG. 1;

FIG. 4 is a top plan view of the structure of FIG. 3;

FIG. 5 is a plan view of the adjustable pintle in the structure of FIG. 1;

FIG. 6 is an elevational front end view of the structure of FIG. 1;

DESCRIPTION OF THE PREFERRED EMBODIMENT

Figure 1:
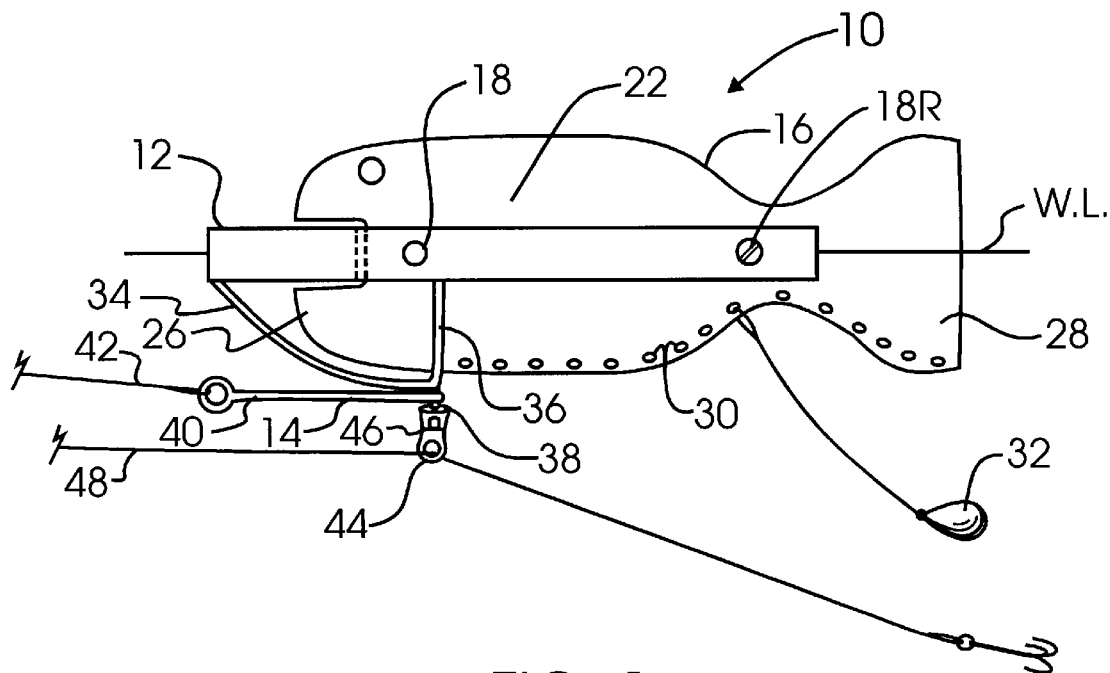
FIG. 1 is an elevational side view of a new and improved preferred embodiment of an aquatic device provided in accordance with the principle of the invention and utilizing the methods thereof.

In accordance with the principles of this invention, a new and improved aquatic device is shown in full or in part in FIGS. 1–19 for practice of the present invention, and is generally indicated by the numeral 10.

The basic zigzag aquatic device 10 as shown in FIGS. 1–6 has a frame 12, a tow bar 14, a guidance vane 16 and a pair of vane pintles 18 which mount and hold the vane 16 to the frame 12. The normal operative waterline in FIGS. 1, 6, 7 & 19 is designated by "W.L.".

The frame 12 is relatively rigid and does not flex in normal use, it also is buoyant and floats in water. The frame 12 has an interior vane recess 20 into which the vane 16 is loosely fitted. The pintles 18 then are secured in the frame 12. The guidance vane 16, as clearly shown in FIGS. 3 & 4, is an initially and normally flat sheet of resilient plastic and has a central main vane section 22 which is that portion of the vane 16 between a pair of spaced apart journals 24 which are apertures through the vane 16. The vane 16 has a contiguous nose 26 forward of the front journal 24, and a tail 28 rearward of the rear journal 24. The cross-sectional area of the tail 28 exceeds the cross-sectional area of the nose 26, and the cross-sectional area of the main vane section 22 is greater than the combined area of both the nose 26 and tail 28. Along the lower edge of the vane 16 in the main section 22 and the tail 28 is a plurality of load apertures 30 to which may be connected ballast weights or a line and working load 32 which may be a fish lure, instrument, or other underwater implement. On the front of the frame 12 is a typical pointed nose and an optional weed deflector 34. On the underside of the frame 12 is the tow bar 14 which has down hoop 36 at the bottom of which is a tow pintle 38 to which is rotatably mounted a swivel tongue 40 having a front eye for being connected to a tow or pull line 42 for power of the device 10 with respect to water. On the bottom of the tow pintle 38 is a work line guide 44 connected to the device by a load sensitive release coupling 46. A work line 48 is threaded through the guide 44, the tow pintle 38 is positioned in close longitudinal proximity to the front pintle 18.

Figure 2:
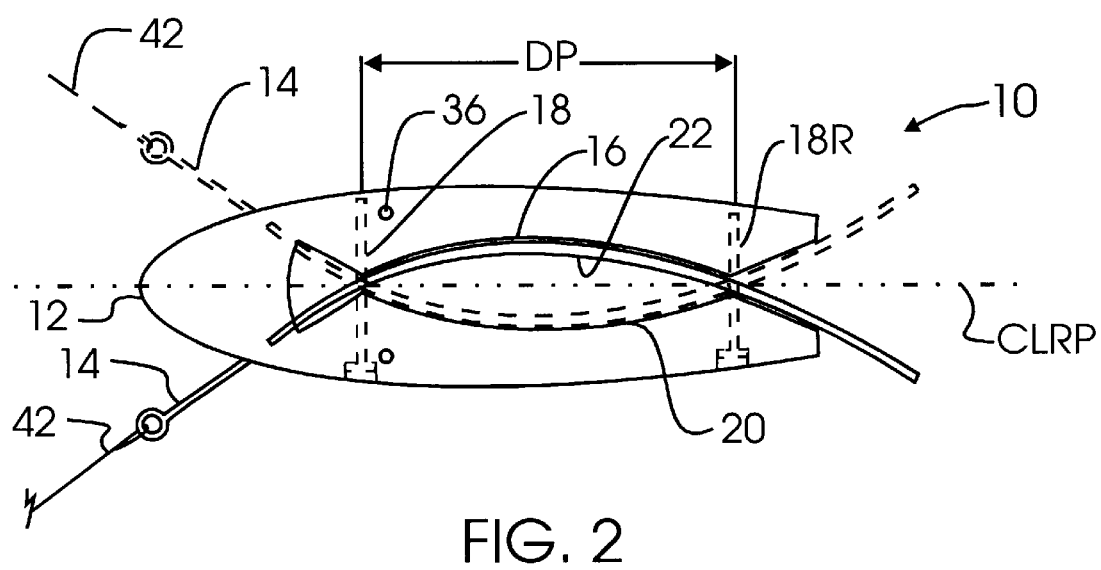
FIG. 2 is a top plan view of the structure of FIG. 1.
Figure 9:
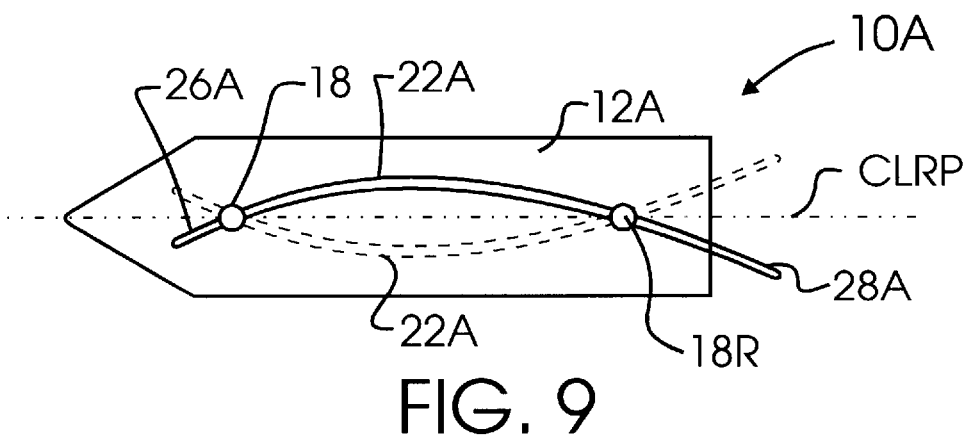
FIG. 9 is a schematic bottom plan view of the structure of this invention.

An important feature of this invention is that the main vane section 22 is placed under compression in the frame 12 by the method of spacing the pintles 18 longitudinally from each other a predetermined distance, 1E "DP" which is less than the distance between the vane journals, 1E "DJ". Consequently, when the guidance vane 16 is installed in the frame 12 and pinned, the pintles 18 compress and bow the main vane section 22 as best shown in FIG. 2. The longitudinal reference plane of the device 10 is indicated in FIGS. 2 & 9 and designated as "CLRP". The guidance vane 16 is not stable on the CLRP, but is bi-stable in a pair of bowed and curved positions as shown in solid line and dotted line in FIG. 2. The guidance vane 16 snaps back and forth between these bi-stable positions, and has a tendency to stay in whichever position it is in. The rear pintle 18R, FIG. 5 has a tool head 50 and a cam section 52 which enables the rear pintle 18R to be turned and adjust the compression of the main vane section 22 to less or more compression, to thereby adjust the zigzag course of the device 10 from a less to a more accentuated course.

Figure 7:
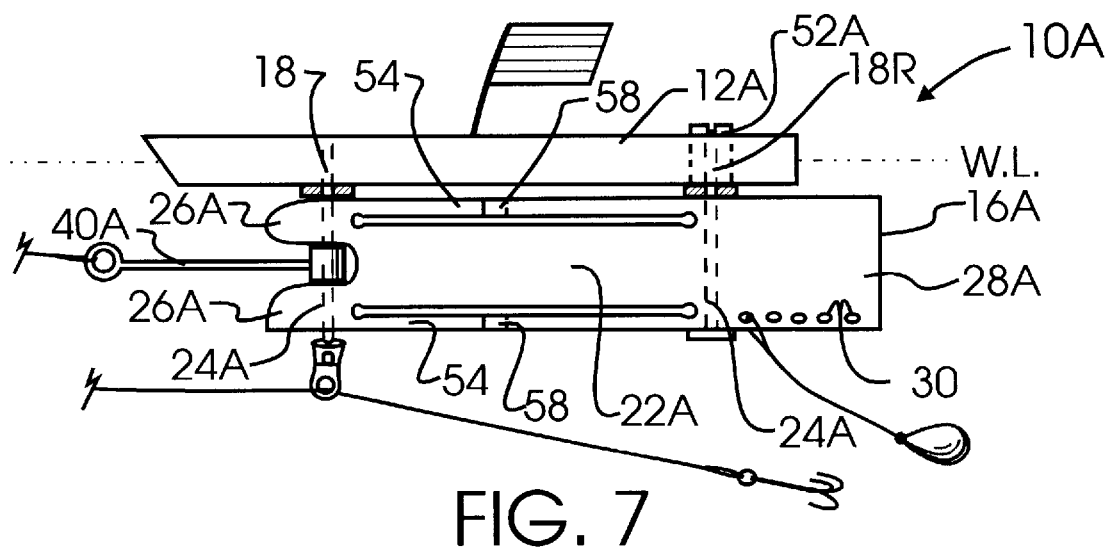
FIG. 7 is an elevational side view of an alternative new and improved preferred embodiment of an aquatic device according to this invention.
Figure 8:
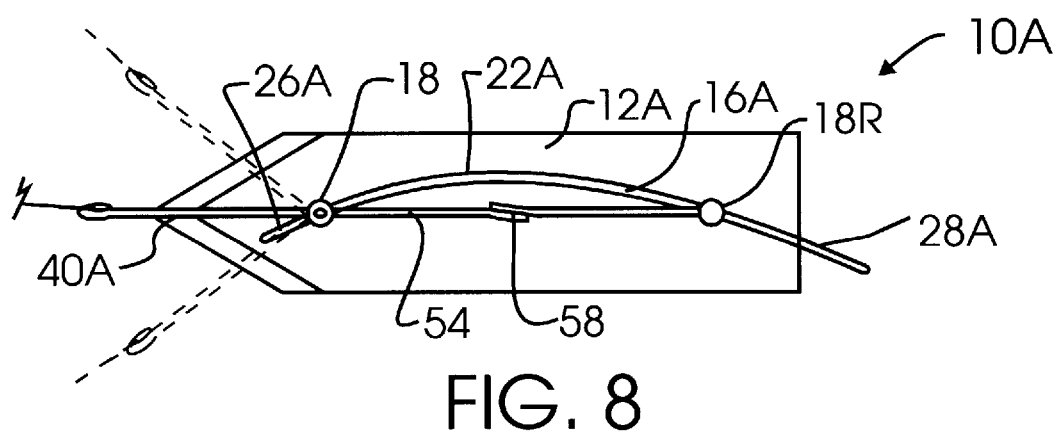
FIG. 8 is a bottom plan view of the structure of FIG. 7.

FIGS. 7 & 8 illustrate a preferred alternative device 10 having a frame 12A which is rigid and buoyant and has a pointed front end. Extending downward from the frame are the pintles 18, 18R and totally below the frame 12A is the guidance vane 16A. The swivel tongue 40A is rotatably mounted on the front pintle 18 below the frame 12. The guidance vane 16A has main vane section 22A, a split nose 26A, tail 28A, load apertures 30 and journals 24A, may have an adjustment cam 52A.

Figure 13:
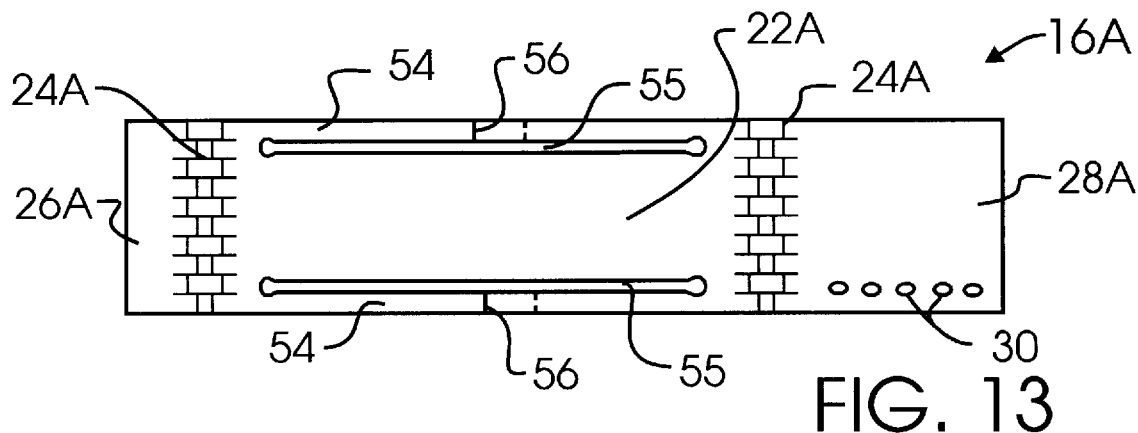
FIG. 13 is a side plan view of the guidance vane in FIG. 7.
Figure 14:
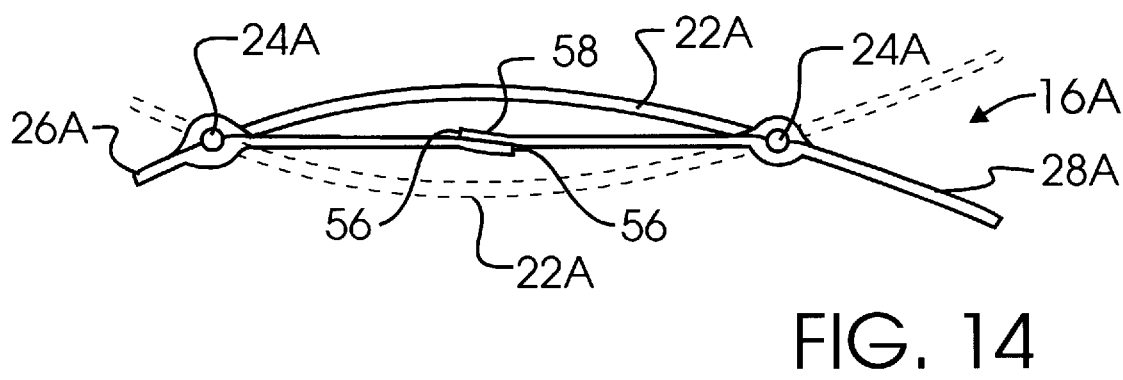
FIG. 14 is an end view of the structure of FIG. 13.

The important feature of this new guidance vane 16A is that it has at least one and preferably a pair of tension members 54 inside of the journals 24A. Referring to FIG. 13, an initially flat sheet of plastic is cut or molded with separation slots 56 between the tension member 54 and the main vane section 22A. The tension members 54 are given end cuts 56 and then, as best shown in FIG. 14, the individual tension members 54 are pulled together, overlapped and welded together by appropriate process such as sonic welding, at a central shortening joint 58. This effective shortening of the re-joined tension members 54 places the main vane section 22A under compression and causes the main vane section 22A to bow as shown in FIGS. 8 & 14. The main vane section 22, nose 26A and tail 28A then become bi-stable as shown in FIG. 14 and previously described. This guidance vane 16A is then placed upon the pintles 18, 18R of frame 12A, and appropriately retained. With this vane 16A, the journals 24A are generally equidistant with the pintles 18, 18R of frame 12A.

Figure 10:
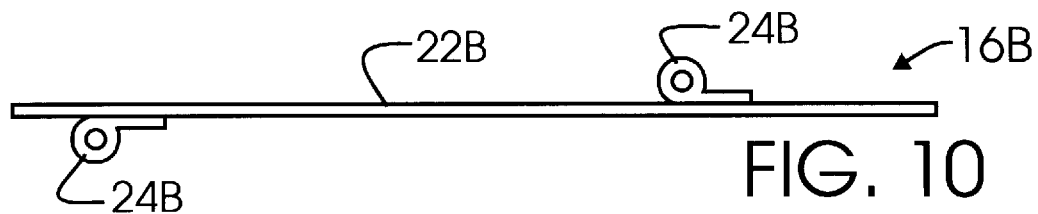
FIG. 10 is a side view of an alternative guidance vane.
Figure 11:
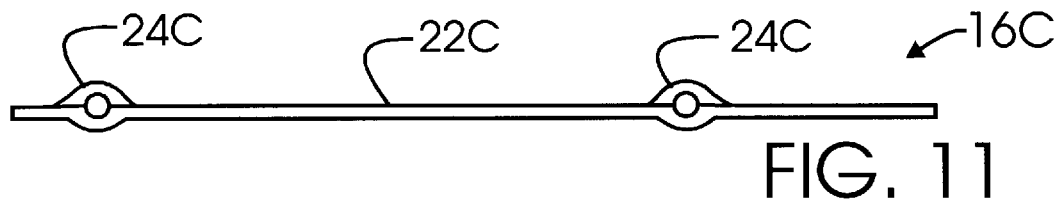
FIG. 11 is a side view of another alternative guidance vane.
Figure 12:
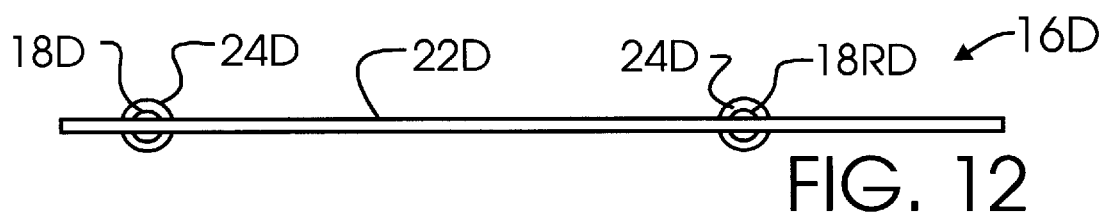
FIG. 12 is a side view of a further alternative guidance vane and pintle structure.

FIG 10 illustrates a further alternative guidance vane 16B having journals 24B welded to the planar sheet. FIG. 11 illustrates a further alternative guidance vane 16C having lanced journals 24C. FIG. 12 illustrates a further alternative embodiment having split post pintles 18D, 18RD and a flat guidance vane 16D having journal and rearward facing journals 24D joined by abutment which engage the full unsplit section of pintles 18D, 18RD to provide compression and bi-stableness to the main vane section 24D. It will be apparent that alternative configuration of pintles 18 and guidance vane 16 are quite viable, and that each product circumstance will require highest value under its specific circumstances.

In FIG. 9, the movement of the bi-stable vane 16 is diagrammatically shown, the vane 16 is not stable on the CLRP, but is stable in either of the bowed configuration, one shown is solid line, the other in dotted line.

Figure 15:
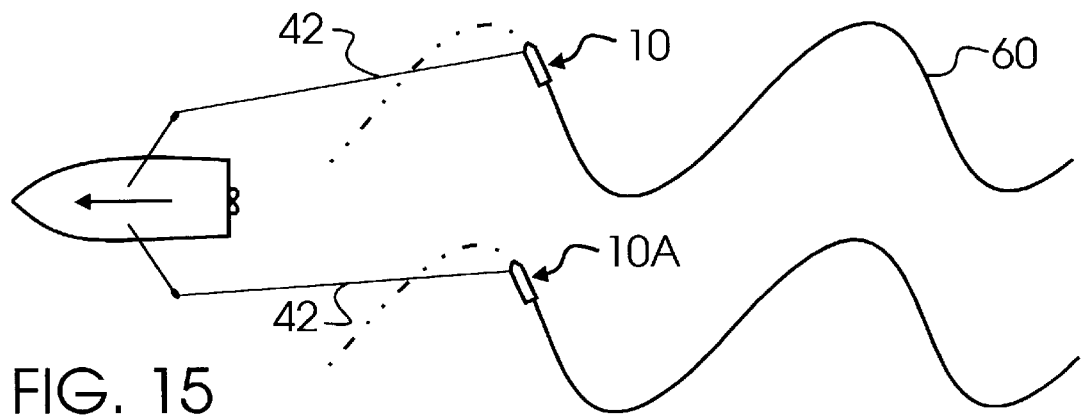
FIG. 15 is a diagrammatic view of the zigzag motion of this invention.

FIG. 15 illustrates the zigzag motion 60 of the device 10 behind a boat. Motion 60 is exemptive of an average motion; if the adjustable pintle 18R is backed off, the motion 60A will be less severe; if the pintle 18R is tightened up to maximize the compression the main vane section 22, the zigzag motion will be maximized.

Figure 16:
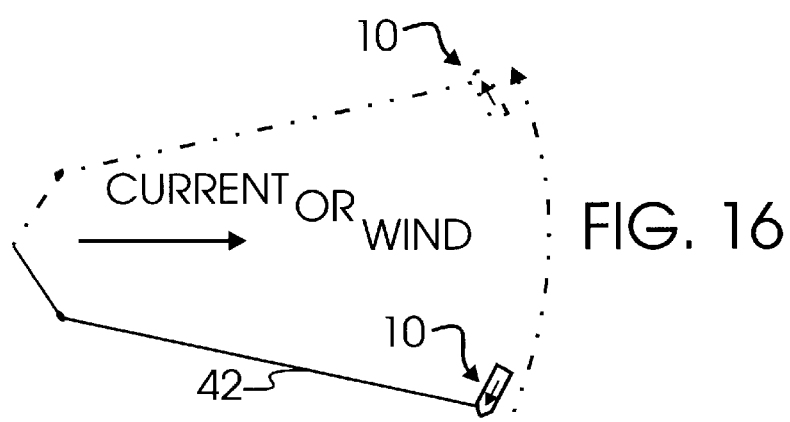
FIG. 16 is a further diagrammatic view of the zigzag motion of this invention.

FIG. 16 illustrates the device 10 being used in a river having current, or in a wind, wherein the user is essentially stationary and the relative water current on the submerged portion of the guidance vane 16 provides the motive power, and/or the wind blowing upon the upward extending exposed part of the guidance vane 16, FIG. 1, provides the motive power. In this application the device 10 goes back and forth while the tether line 42 remains of constant lengths, and zigzags when the tether line 42 is being shortened or lengthened.

Figure 17:
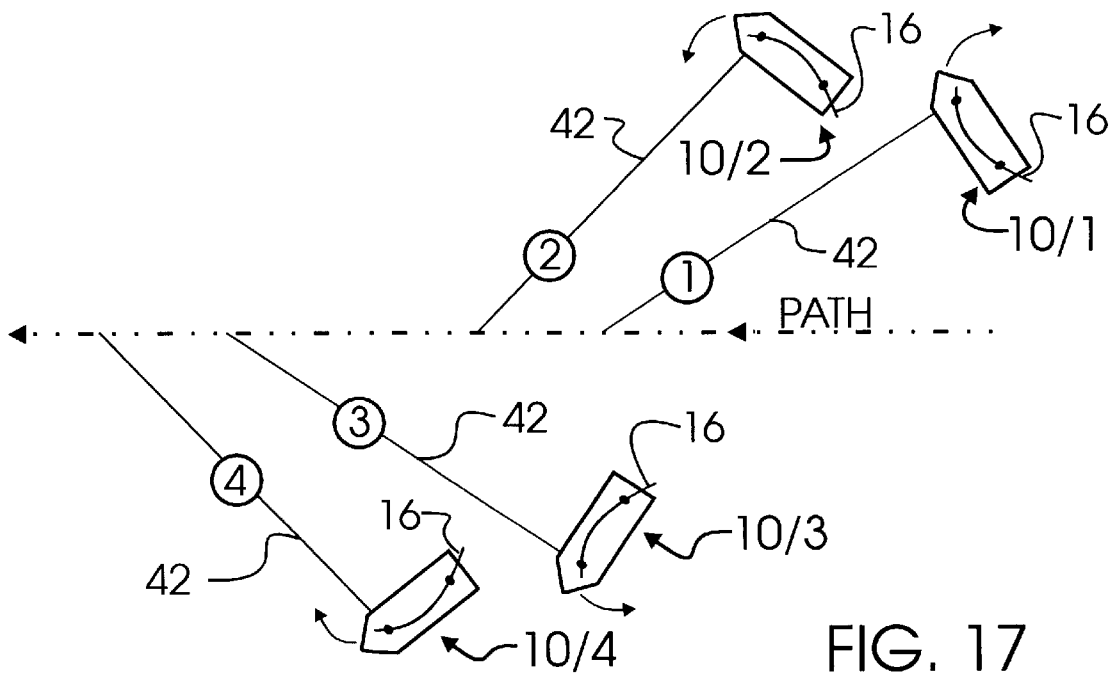
FIG. 17 is an explanatory diagrammatic view of the motion of this invention.

FIG. 17 is a schematic diagram with which the methodology and operation of the device 10 of this invention can be explained. The device 10 is operable with a single tether line 42 and without electronics and/or radio of any type. Assuming a tow boat is heading across on the paths from right to left, the device 10/1 is justly shown with its guidance vane 16 bowed bi-stably to portside (left from above the device, while looking forward) and the device is transversing to the left. Upon the device 10/1 attaining a far-to-the-left position, the tether line 42 can be snapped forward to cause a surge of water resistance against the main vane section 22 whereupon the vane 16 snaps into a starboard bow position as shown in position 10/2. As motion of the device 10/2 continues, the device turns CCW, turn about and traverses across from left to right (from top to bottom in FIG. 17) to position 10/3, where upon the line 42 can again be snapped and the surge of water resistance against the main vane section 22 will snap the vane 16 back to the portside configuration shown in 10/4 whereupon the device 10/4 will turn CW and transverse from right to left (bottom to top in FIG. 17) to re-attain the equivalent of position 10/1, abet further along the path of the tow boat. It is also possible to make the snap action of the vane 16 automatic as drag builds up when the device 10 is in the outer positions and should change direction. The main vane section 22 having the largest area is the structure enabling the line snap or automatic change of the vane 16 between its bi-stable positions.

It has been found advantageous to structure the adjustable pintle 18R and cam 52 so that the cam 52 can be turned to release the main vane section 22 from compression, 1E no compression, during periods of non-use, storage and the like, to prevent creep in the plastic vane 16 and prevent the vane 16 from taking a set. It has also been found advantageous to provide a handle 51 on the pintle head 50.

Figure 18:
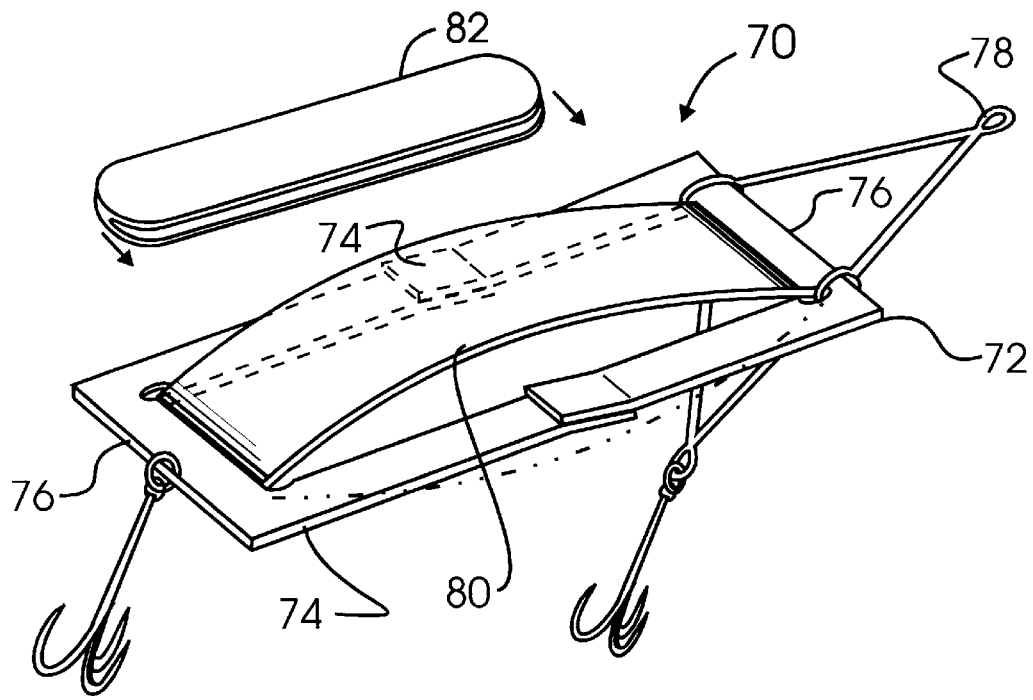
FIG. 18 is a perspective view of an alternative submersible version of this invention.
Figure 19:
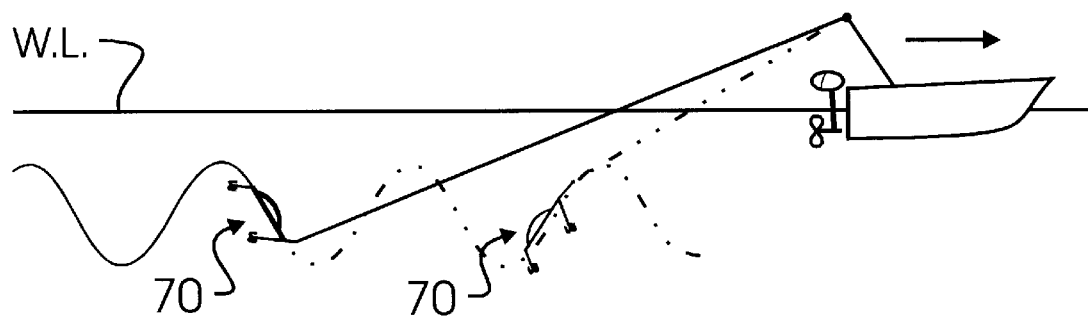
FIG. 19 is a motion diagram for the apparatus of FIG. 18.

FIG. 18 illustrates the method and apparatus of this invention embodied in a submersible fishing lure device 70. In this device 70 the frame 72 is comprised of the tension members 74 and end members 76. A front tow bar 78 is provided and swiveled to the frame 72, and the guidance vane 80 is journaled at it ends to the end members 76 which also serve as the pintles. Motion of the lure device 70 is shown diagrammatically in FIG. 19 wherein an accentuated up and down, 1E "roller-coaster" motion is provided when the device 70 is pulled by a boat or retrieved after casting. When the bi-stable guidance vane 80 is bowed up, the device 70 turns down. When the guidance vane 80 is bowed down, the device 70 turns up. Normally the device 70 will be totally submergible track in a straight line when seen from above or below. But, an optional float 82 may be clipped on either side of the device 70 to cause the device to cant in the water and cause a compound up and down and side-to-side zigzag motion.

It is also anticipated that either device 10, 10A may have a diving vane structure on it and be submersible, while providing the same motion shown in FIGS. 15–17.

I have expectations that the basic apparatus 10 and the methods herein described, are new and useful in a variety of aquatic devices including others, fish equipment, testing devices, photography, and so forth.

Although other advantages may be found and realized, and various modifications maybe suggested by those versed in the art, be it understood that I embody within the scope of the patent warranted hereon, all such embodiments as reasonably and properly come within the scope of my contributions to the arts and knowledge.

I claim as my invention:

1. An aquatic device for providing zigzag motion, comprising:
   a) a frame;
   b) means for connecting said frame to a pull line;
   c) a pair of pintles on said frame, said pintles being spaced longitudinally on said frame a predetermined distance from each other;
   d) a bi-stable guidance vane which is relatively flexible with respect to said frame, said vane having a pair of journals mounted one to each said pintle, said vane having a main vane section in compression between said pintles, said main vane section being stable in a first or in a second obtusely bowed position, said positions being on opposite transverse sides of a hypothetical flat longitudinal reference plane between said pintles, for causing the device to travel in either a first or a second path through water, said main vane section being repetitively movable between said first and second position for causing zigzag motion of the device through water.

2. The device of claim 1, in which said frame is buoyant and relatively rigid with respect to said guidance vane.

3. The device of claim 1, in which said line connecting means includes a swivel tongue rotatably mounted to said frame.

4. The device of claim 2, in which said pintles are in front and rear positions on said frame, and in which said swivel tongue is rotatably mounted on said front pintle.

5. The device of claim 1, in which one of said pintles includes adjustable cam structure, for selective adjustment of the distance between said pintles, for adjusting compression of said main vane section and thereby the zigzag motion of said device.

6. The device of claim 1, in which said frame is a buoyant body, and in which said main vane section includes a submergible portion below said buoyant body, and a portion of like contour extending upward above said buoyant body, for catching wind above the water.

7. The device of claim 1, in which said pintles are a pair of pins, and said journals are a pair of apertures in said guidance vane, said pintle pins being extended through said vane generally perpendicular to the plane of said vane.

8. The device of claim 7, in which said main vane section is at least partially enclosed within a buoyant said frame.

9. The device of claim 1, in which said guidance vane has a tail section aft of said pintles, said tail section being co-movable with said main vane section but being on an opposite side of the reference plane from said main vane section.

10. The device of claim 1, in which said guidance vane has a nose section, said nose being co-movable with said main vane section but being on an opposite side of the reference plane from said main vane section.

11. The device of claim 1, in which said guidance vane includes a nose section and a tail section, said main vane section having a greater area than said nose section and said tail section combined.

12. The device of claim 11, in which said tail section is larger than said nose section.

13. The device of claim 11, in which said line connecting means is connected to said frame at a longitudinal location proximate to a front one of said pintles.

14. The device of claim 1, in which said guidance vane is an initially and normally flat piece of resilient plastic.

15. A method of providing self steering zigzag motion in an aquatic device, comprising the steps of:
   a) providing a frame for an aquatic device, and providing front and rear pintles on said frame;
   b) mounting a generally flat planar guidance vane in compression between said front and rear pintles upon said frame, and holding said vane bi-stably in either of two opposed generally curved positions;
   c) moving the device through water by pulling said frame from adjacent to said front pintle with a tether line; and
   d) causing said vane to repetitively soap from one of said positions to the relatively opposed position, thereby causing said device to follow a zigzag path through the water.

16. The method of claim 15, including the further step of selectively adjusting the compression of said guidance vane and thereby adjusting the zigzag motion of the device.

17. The method of claim 15, including the further step of pulling said device by said front pintle.

* * * * *